US011305293B2

(12) United States Patent
DeFino

(10) Patent No.: US 11,305,293 B2
(45) Date of Patent: Apr. 19, 2022

(54) METHOD AND APPARATUS FOR RECYCLING ASPHALT MILINGS

(71) Applicant: Hector DeFino, Parlin, NJ (US)

(72) Inventor: Hector DeFino, Parlin, NJ (US)

(*) Notice: Subject to any disclaimer, the term of this patent is extended or adjusted under 35 U.S.C. 154(b) by 176 days.

(21) Appl. No.: 16/737,687

(22) Filed: Jan. 8, 2020

(65) Prior Publication Data

US 2021/0205820 A1 Jul. 8, 2021

(51) Int. Cl.
*B02C 23/30* (2006.01)
*B02C 15/00* (2006.01)
*C10C 3/00* (2006.01)

(52) U.S. Cl.
CPC ............ *B02C 23/30* (2013.01); *B02C 15/004* (2013.01); *C10C 3/007* (2013.01); *B02C 2015/002* (2013.01)

(58) Field of Classification Search
CPC ........ B02C 15/004; B02C 17/16; E01C 19/05
USPC .................................................. 241/208, 299
See application file for complete search history.

(56) References Cited

U.S. PATENT DOCUMENTS

| 303,125 A * | 8/1884 | Corcoran | B02C 15/16 241/228 |
| 3,204,878 A * | 9/1965 | Peacock | B02C 17/10 241/15 |
| 4,175,335 A * | 11/1979 | Avril | F26B 11/0413 34/128 |
| 4,383,379 A * | 5/1983 | Avril | F26B 11/0413 34/128 |
| 4,427,376 A * | 1/1984 | Etnyre | E01C 7/267 366/25 |

(Continued)

FOREIGN PATENT DOCUMENTS

| JP | 2006061898 | 3/2006 |
| WO | WO 2013/188526 | 12/2013 |

OTHER PUBLICATIONS

European Search Report, Appl. No. EP 20 21 7885, dated Jun. 29, 2021.

*Primary Examiner* — Faye Francis
(74) *Attorney, Agent, or Firm* — Lawrence B. Goodwin; Mandelbaum Barrett PC

(57) ABSTRACT

Apparatus and method for recycling asphalt millings containing bitumen and stone. A milling tube is provided having an outer tube and an inner tube axially aligned with and substantially contained within the outer tube, the inner tube having a diameter less that a diameter of the outer tube to thus define a mixing space between the inner and outer tubes. At least one of the inner and outer tubes is adapted to rotate relative to the other. An inlet is provided to the mixing space to receive the asphalt millings. A plurality of inner tube projections project radially outward from a surface of the inner tube toward the outer tube, and a plurality of outer tube projections project radially inward from a surface of the outer tube toward the inner tube. The milling tube facilitates the separation of the asphalt millings into bitumen and stone as one of the inner and outer tubes rotates relative to the other. Preferably, at least one of the outer and inner tubes contains an abrasive coating on a surface thereof, the inner tube projections and outer tube projections are comprised of wire rope, and an inlet is provided in the outer tube through which cold air can be applied to the mixing space.

7 Claims, 4 Drawing Sheets

(56) References Cited

U.S. PATENT DOCUMENTS

| | | | | |
|---|---|---|---|---|
| 4,580,734 A * | 4/1986 | Eroskey | ................ | B02C 17/225 241/182 |
| 5,161,745 A * | 11/1992 | Valeri | ................ | B02C 17/1855 241/171 |
| 5,188,299 A * | 2/1993 | Hendrickson | ....... | E01C 19/1036 241/167 |
| 5,269,471 A * | 12/1993 | Yamagishi | ............. | B02C 13/10 241/228 |
| 5,294,062 A * | 3/1994 | Hendrickson | ....... | E01C 19/1036 241/167 |
| 5,344,088 A | 9/1994 | Page | | |
| 5,520,342 A * | 5/1996 | Hendrickson | ....... | E01C 19/1036 241/167 |
| 5,743,475 A * | 4/1998 | Catani | ................ | B02C 17/10 241/57 |
| 5,794,865 A * | 8/1998 | Didion | ................ | B22C 5/0459 164/404 |
| 5,884,856 A * | 3/1999 | Isaji | ................ | B03B 13/00 241/76 |
| 6,340,240 B1 * | 1/2002 | Swisher, Jr. | ........ | E01C 19/1036 34/137 |
| 7,669,792 B1 * | 3/2010 | Anderson | ........... | E01C 19/1036 241/33 |
| 8,231,262 B1 * | 7/2012 | Anderson | ........... | E01C 19/1036 366/25 |
| 8,910,891 B2 * | 12/2014 | Sharp | ................ | B02C 17/007 241/36 |
| 8,955,778 B2 * | 2/2015 | Nordell | ................ | B02C 15/003 241/228 |
| 2009/0136295 A1 | 5/2009 | Boyd | | |
| 2012/0085845 A1 * | 4/2012 | Landis | ................ | E01C 19/1036 241/23 |
| 2013/0008986 A1 | 1/2013 | Zickell | | |
| 2015/0209795 A1 * | 7/2015 | Nordell | ................ | B02C 15/06 241/228 |

* cited by examiner

METHOD AND APPARATUS FOR RECYCLING ASPHALT MILINGS

BACKGROUND OF THE INVENTION

Asphalt road surfaces typically require periodic resurfacing to repair damage due to many environmental factors, including heat, freezing conditions and normal road wear. The resurfacing involves, as a first step, the milling of the top surface of the asphalt wherein the surface is ground through the use of a cold plane milling machine and removed, leaving the underlying roadbed upon which fresh asphalt can be deposited.

The asphalt millings, sometimes referred to as bituminous concrete, are an environmental concern. The problem with asphalt millings is that the bitumen binder used in asphalt paving applications contains a relatively large concentration of a family of carcinogenic compounds which can pose serious human health and environmental concerns in certain circumstances, such as when the asphalt millings are blown off or washed from the surface of the waste material. These compounds, known as polycyclic aromatic hydrocarbons (PAHs), are specified as targeted pollutants by the U.S. Environmental Protection Agency (USEPA), and are present in asphalt at much higher levels than the criteria established by most states for general use on land. Such materials have the potential to significantly contaminate surrounding soils and/or surface water sediments.

To a certain extent, asphalt millings may be recycled in accordance with many state's regulations for recycling. Of course, the use of loose unbound asphalt millings on roadway surfaces without the placement of a paved top surface is not appropriate for the reasons noted above. Although many states permit millings to be used by road asphalt manufacturing plants for direct incorporation into new asphalt, the amount of millings per new asphalt that can be used is typically 20% or less. Thus, at least 80% of the millings are effectively wasted and cannot be used due to state environmental restrictions. As such, there is a need for a system for recycling asphalt millings and methods thereof.

A solution to this problem has been proposed by the present inventor, in U.S. Ser. No. 14/031,027, entitled SYSTEM FOR RECYCLING ASPHALT MILLINGS AND METHODS THEREOF, filed Sep. 18, 2013. That invention included an initial step of churning the asphalt millings using a liquid compound and optionally, the external application of heat. Although a significant advance in the recycling of asphalt millings, the mixture was required to sit for an extended period of time to cause the oil to loosen from the stone. This process would then create a liquid residue that would require further disposal.

The present invention is directed to a significant improvement to the technology set forth in the above application, and to a method and apparatus that have the ability to cleanly and efficiently separate stone from bitumen to thereby recycle effectively 100% of the asphalt millings.

SUMMARY OF THE INVENTION

In accordance with a first aspect of the invention, apparatus for recycling asphalt millings containing bitumen and stone comprises a milling tube having an outer tube and an inner tube axially aligned with and substantially contained within the outer tube, the inner tube having a diameter less that a diameter of the outer tube to thus define a mixing space between the inner and outer tubes. At least one of the inner and outer tubes is adapted to rotate relative to the other. An inlet is provided to the mixing space to receive the asphalt millings. A plurality of inner tube projections project radially outward from a surface of the inner tube toward the outer tube, and a plurality of outer tube projections project radially inward from a surface of the outer tube toward the inner tube. The milling tube facilitates the separation of the asphalt millings into bitumen and stone as one of the inner and outer tubes rotates relative to the other. Preferably, at least one of the outer and inner tubes contains an abrasive coating on a surface thereof, the inner tube projections and outer tube projections are comprised of wire rope, and an inlet is provided in the outer tube through which cold air can be applied to the mixing space. In accordance with an embodiment of the invention, the inner tube rotates within the outer tube, and the abrasive coating is located on an interior surface of the outer tube. An input conveyor adapted to feed the asphalt millings to the inlet to the mixing space can also be provided.

In accordance with another embodiment, method is provided for recycling asphalt millings containing bitumen and stone, comprising delivering the asphalt millings to a mixing space having an abrasive surface, mixing the asphalt millings in the mixing space during which the millings are exposed to the abrasive surface, applying cold air to the asphalt millings during at least a portion of the mixing step, wherein the steps of mixing and applying cold air facilitate the separation of the bitumen and stone. The step of mixing the asphalt millings heats the millings through friction, before the step of applying cold air to the millings. The step of mixing occurs in the mixing space defined between an outer tube and an inner tube axially aligned with and substantially contained within the outer tube, the inner tube having a diameter less that a diameter of the outer tube. The step of mixing preferably comprises rotating the inner tube within the outer tube, and the step of applying cold air comprises the application of one of liquid nitrogen or dry ice to the asphalt millings.

BRIEF DESCRIPTION OF THE DRAWINGS

These and other aspects of the invention will be described with reference to the following drawing figures, of which.

DETAILED DESCRIPTION

As will be described, the present invention is directed to a method and apparatus that cleanly and efficiently separates stone from bitumen in asphalt millings, that does not require the application of external heat, liquid, churning, or processing time, that is free from run off, that can be implemented in a mobile apparatus on project sites, and which will yield 100% recyclable materials, namely bitumen and stone. The present invention can also be utilized within asphalt plants, landfills, and/or any location permitted by state and local ordinances.

Figure 1:
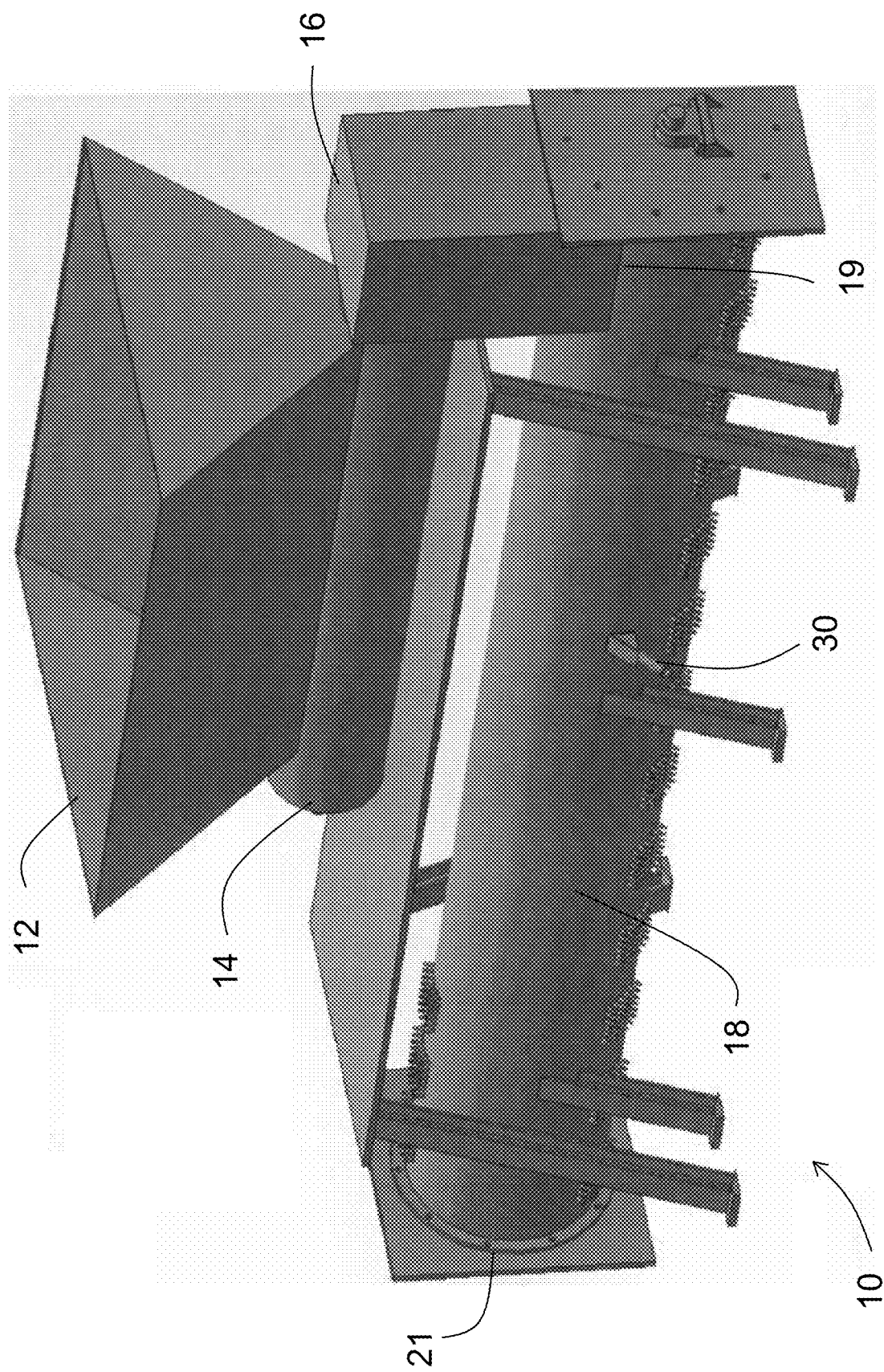
FIG. 1 is a perspective view of the apparatus in accordance with the present invention.
Figure 2:
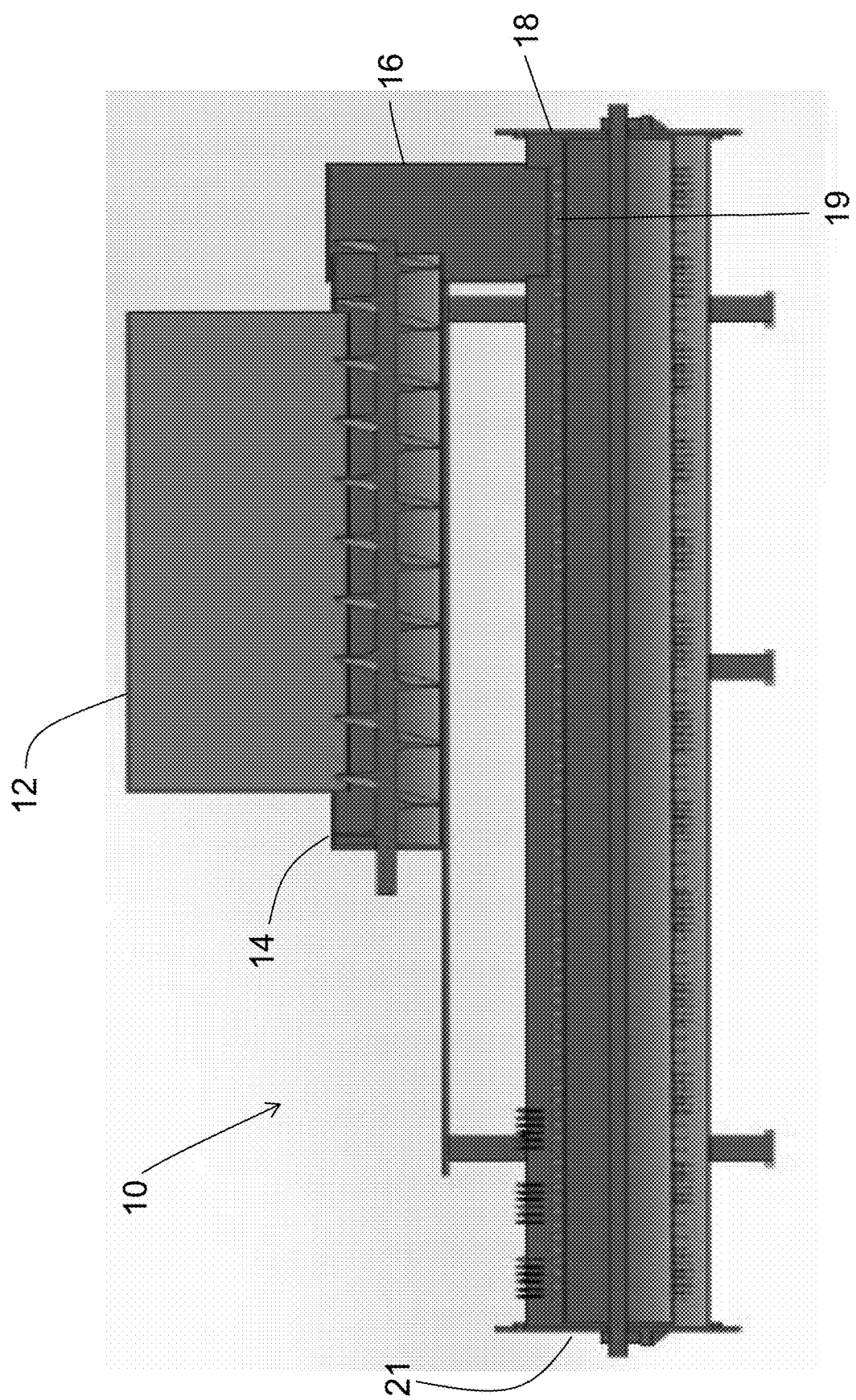
FIG. 2 is a cut-away illustrating the interior structure of the apparatus of FIG. 1.

With reference to FIGS. 1 and 2, an example of an apparatus 10 in accordance with the present invention is shown. A hopper 12 is provided for accepting the asphalt millings by physical or automated means. The asphalt millings are passed through hopper 12 where they flow onto an auger or screw conveyor 14, where the asphalt millings are spread and dried. Although not shown, the conveyor 14 is preferably provided with perforations, allowing air to be passed therethrough to facilitate the drying of the millings. The conveyor 14 may also be provided with grates placed to allow for any obstruction materials to be discarded and/or collected. At this point, the conveyed and dried the asphalt millings can be inspected by physical or automated means, if desired, and then passed into controlled hopper 16. Controlled hopper 16 can be manned physically and/or automated, and functions to meter an appropriate amount of dried asphalt millings into asphalt milling tube 18 (at inlet 19), which will be described with reference to FIGS. 3 and 4.

Figure 3:
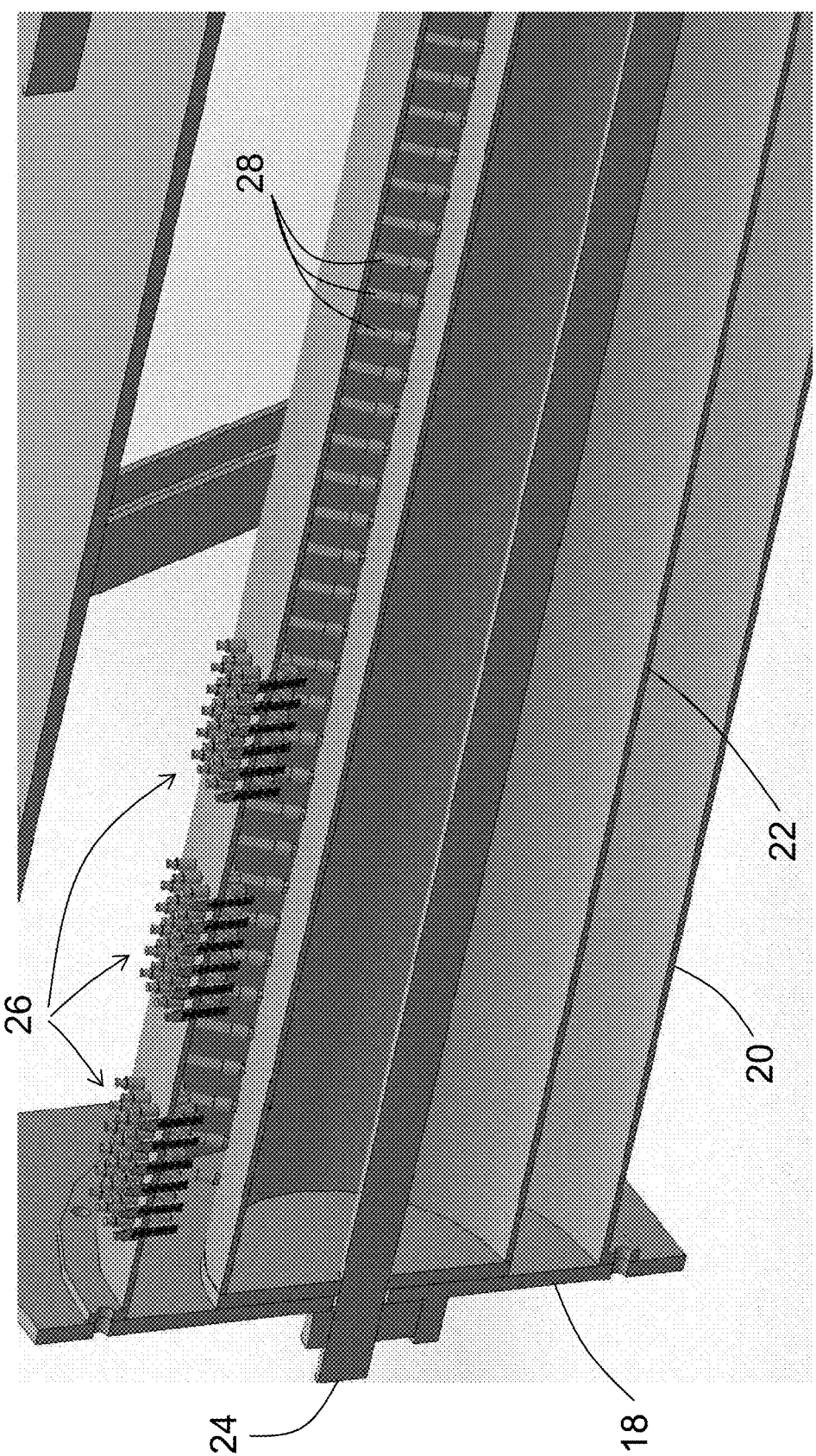
FIG. 3 is an illustration of the interiors of the inner and outer tubes in accordance with the present invention.
Figure 4:
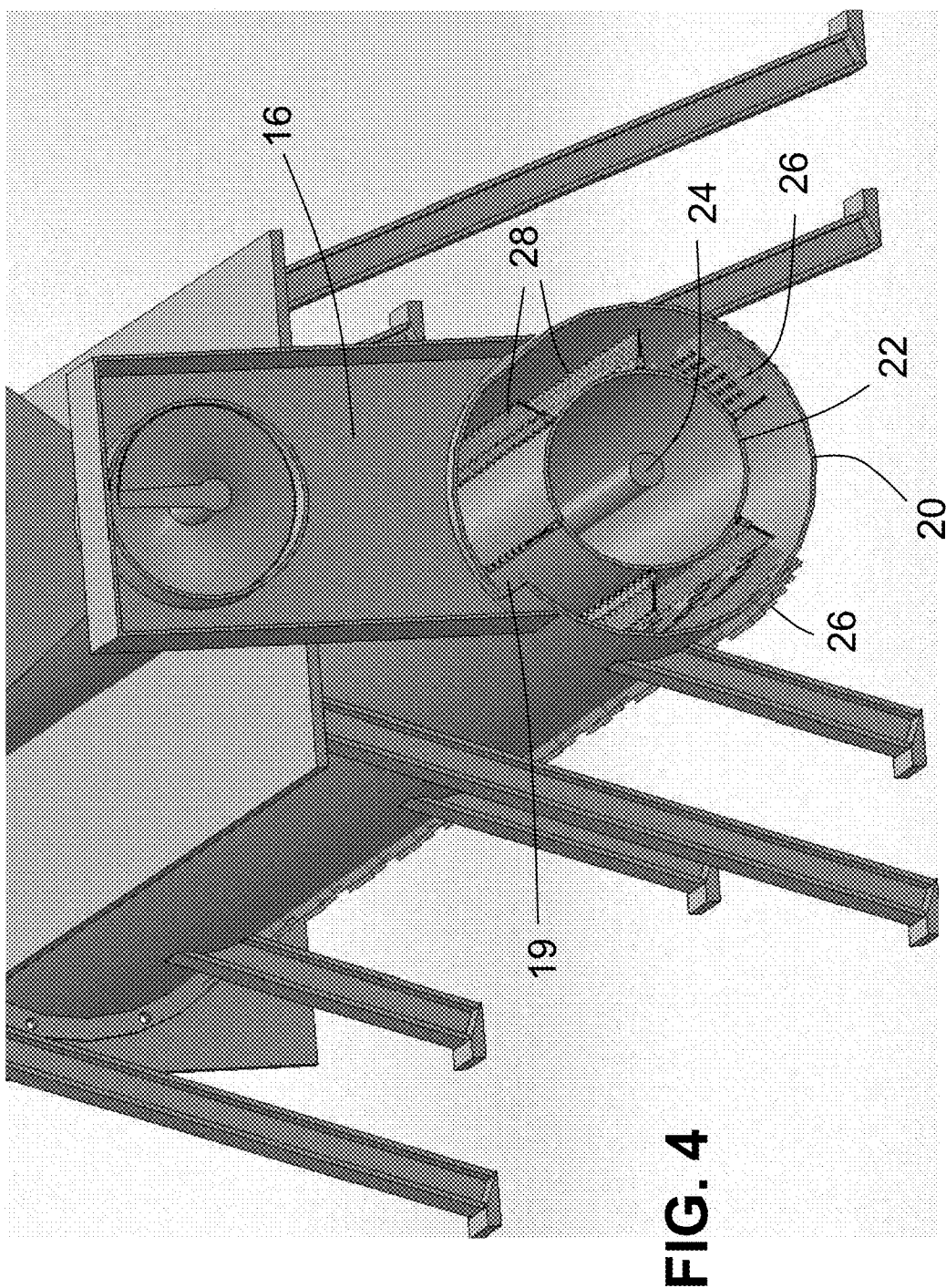
FIG. 4 is an illustration of the interiors of the input end of the apparatus in accordance with the present invention.

As shown in FIGS. 3 and 4, milling tube 18 is comprised of an outer tube 20 and an axially aligned inner tube 22 which is rotatable within outer tube 20. Outer tube 20 may be constructed of steel in various thicknesses (for example, one-quarter to one-half inch), and may be approximately 30 inches in diameter, for example, although other materials, diameters and thicknesses may be employed if desired. Inner tube 22 may also be constructed of steel, have various thicknesses (for example, one-quarter to one-half inch) and may be approximately 18 inches in diameter for an outer tube 30 inches in diameter, although other relative dimensions may be selected if desired. Inner tube 22 rotates within outer tube 20 by means of axial shaft 24, best shown in FIG. 3. Shaft 24 can be approximately 3 inches in diameter, although other sizes may be used if desired. The overall length of the milling tube 18 can be approximately 10 to 20 feet, although other dimensions may be used, if desired.

As best shown in FIGS. 3 and 4, outer tube 20 is provided with wire rope "bullets" 26 that protrude radially into the interior of the tube. Bullets 26 may be arranged in the configuration shown in FIG. 3, where 4×6 matrices of bullets can be placed at various locations along the tube 20, as desired, depending upon the asphalt millings that are processed. Each bullet 26 can be formed of one-half inch steel wire rope crimped at about 10,000 lbs. in half inch Schedule 40 steel pipe, and will protrude approximately one-half inch into the interior of the tube (beyond the abrasive coating, discussed below).

Inner tube 22 is provided with wire rope brushes 28 that project radially outwardly toward the outer tube. Different configurations and locations of brushes 28 can be used, but preferably, brushes 28 can be configured in a generally helical arrangement, so that they function as an auger to move the millings from the input end 19 of milling tube 18 to its output end 21. Each brush 28 can be formed of one-half inch steel wire rope crimped at about 10,000 lbs. in half or three quarter inch Schedule 40 steel pipe and will protrude approximately one-half inch from the surface of tube 22.

Thus, it will be appreciated that the combination of the bullets 26 and the rotating wire brushes 28 turbulently mix the millings during the separation process. It is again noted that other dimensions can be used in accordance with the present invention, as will be appreciated in view of the present disclosure.

Finally, the inner surface of the outer tube 20 is coated with an abrasive. For example, a mineral compound can be prepared by mixing an epoxy and hardener with a mixture of non-fibrous aluminum oxide, aluminum silicate, and/or titanium aluminum oxide, which may be obtained commercially in the form of Bauxite. Alternatively, instead of Bauxite, silicon carbide or diamond particles may be used.

The above abrasive materials are mixed with the epoxy/hardener and coated on the inner surface of the outer tube 20 to thereby provide a coarse, abrasive layer which can be approximately ⅜ inch in thickness.

In operation, the asphalt millings enter outer tube 20 from controlled hopper 16 at a rate of approximately 35 pounds per second. Inner tube 22 is rotated at approximately 300 revolutions per minute, and wire brushes 28 spin the asphalt millings against bullets 26 and the abrasive surface. The friction resulting from this action creates heat which facilitates the separation process; depending on the climate and season of the year, the application of additional heat may be required. Outer tube 20 is then jetted with liquid nitrogen, dry ice or the like through jet inlet 30, FIG. 1, located downstream of the inlet 19. This combination of the turbulent mixing of the millings against the abrasive coating, the generation of heat and the subsequent application of cold, causes the bitumen to separate from the stone, leaving a re-usable natural asphalt binder (bitumen), and stone. The natural asphalt binder is then removed from the output end 21 of milling tube 18 and collected through a series of grates, conveyors and possibly vacuums that function to separate the binder from the stone in a manner that will be understood.

Thus, the foregoing process can convert asphalt millings to be 100% recyclable as natural asphalt binder and clean stone.

I claim:

1. Apparatus for recycling asphalt millings, said millings containing bitumen and stone, said apparatus comprising:
    a. a milling tube having an outer tube and an inner tube axially aligned with and contained within said outer tube, said inner tube having a diameter less than a diameter of said outer tube to thus define a mixing space between said inner and outer tubes, either one of said inner and outer tubes rotating relative to and separately from the other,
    b. an inlet to said mixing space adapted to receive said asphalt millings;
    c. a plurality of inner tube projections projecting radially outward from a surface of said inner tube toward said outer tube;
    d. a plurality of outer tube projections projecting radially inward from a surface of said outer tube toward said inner tube;
    e. whereby said milling tube facilitates the separation of said asphalt millings into bitumen and stone as one of said inner and outer tubes rotates relative to the other.

2. The apparatus of claim 1, wherein at least one of said outer and inner tubes contains an abrasive coating on a surface thereof.

3. The apparatus of claim 2 wherein said inner tube projections and outer tube projections are comprised of wire rope.

4. The apparatus of claim 2 further comprising an inlet in said outer tube through which cold air can be applied to said mixing space.

5. The apparatus of claim 2 wherein said inner tube rotates within said outer tube.

6. The apparatus of claim 5 wherein said abrasive coating is located on an interior surface of said outer tube.

7. The apparatus of claim 2 further comprising an input conveyor adapted to feed said asphalt millings to said inlet to said mixing space.

* * * * *